Figure 1:
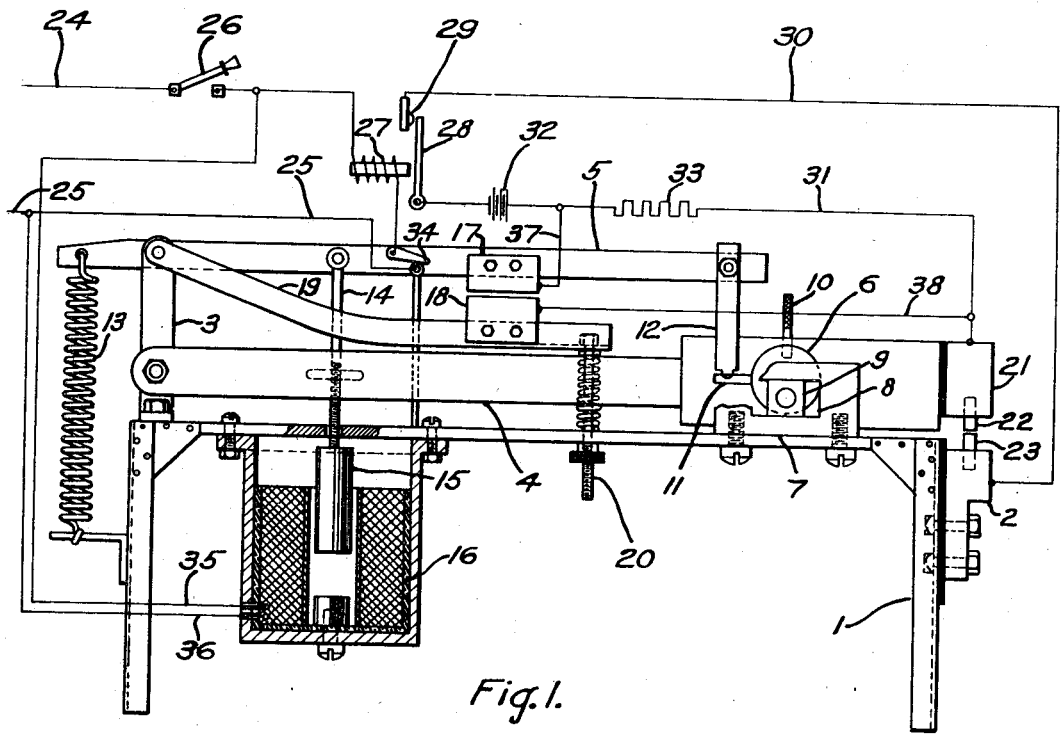

April 21, 1925.

A. M. MacFARLAND 1,534,069

PERCUSSIVE WELDING MACHINE

Filed April 11, 1922

WITNESSES:
R. J. Butler
W. B. Jaspert

INVENTOR
Allis M. MacFarland.
BY
Wesley G. Carr
ATTORNEY

Patented Apr. 21, 1925.

1,534,069

UNITED STATES PATENT OFFICE.

ALLIS M. MacFARLAND, OF WILKINSBURG, PENNSYLVANIA, ASSIGNOR TO WESTINGHOUSE ELECTRIC & MANUFACTURING COMPANY, A CORPORATION OF PENNSYLVANIA.

PERCUSSIVE WELDING MACHINE.

Application filed April 11, 1922. Serial No. 551,529.

*To all whom it may concern:*

Be it known that I, ALLIS M. MACFARLAND, a citizen of the United States, and a resident of Wilkinsburg, in the county of Allegheny and State of Pennsylvania, have invented a new and useful Improvement in Percussive Welding Machines, of which the following is a specification.

My invention relates to automatic welding machines, more especially to machines of the electro-percussive type in which the electrodes or members to be welded are fused to a melting temperature and forged by means of percussive engagement.

It is among the objects of this invention to provide an apparatus which shall be automatic in its function and which shall produce efficient welds of material having characteristics which will not permit welding thereof in the ordinary manner.

It is another object of this invention to provide an apparatus, which shall be simple in construction, consisting of a minimum number of operating parts and which shall be simple to operate, requiring no especially skilled operator.

It is a further object of this invention to provide an apparatus of the above designated type which shall function to automatically control the various steps of the welding process and insure a uniform quality of welds.

The practice of forming electro-procussive welds is well known and consists of fusing the adjacent surfaces of a pair of electrodes to be welded by a suitable welding arc and then bringing the fused electrodes into percussive engagement.

My present invention distinguishes from the prior art in that I provide an apparatus which is designed to prevent accidental rebound or vibration which may otherwise occur while the fused metal is cooling and which tends to produce a crystalline structure detrimental to the weld.

Another distinctive feature of my invention is the establishing of a preliminary or pilot arc between the electrodes prior to applying the welding arc of relatively high intensity. In performing this double function, I utilize the same source of electrical energy by employing a suitable resistor and a number of circuits which are automatically controlled by mechanically and electrically operated contacts, as will be hereinafter described.

In the accompanying drawing, constituting a part hereof and in which like reference characters indicate like parts—

Figure 2:
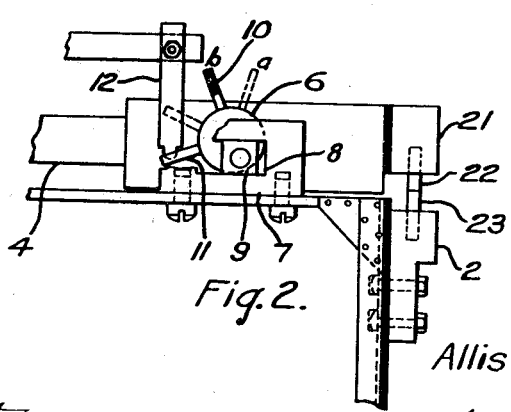

Figure 1 is an elevational view of my apparatus, certain parts being shown in section and the electrical connections being shown diagrammatically; and Fig. 2 is a detail view showing part of the apparatus in a different stage of operation.

My apparatus consists of a support 1 having a workholder clamping chuck 2 secured at one end thereof and having a supporting bracket 3 mounted at the opposite end for pivotally mounting a pair of lever arms 4 and 5. The lever 4, at its free end, has an enlarged body portion and is supported on an eccentric pin or trip dog 6 pivotally mounted in a supporting bracket 7, having an elongated opening 8 to permit lateral movement of the journal block 9 therein.

The pin 6 is provided with a pair of projecting trip levers 10 and 11. The lever arm 5 is provided with a downwardly projecting finger 12 for engaging the trip lever 11 and is secured at its opposite end to the support 1 by a helical spring 13 to maintain a neutral position of the finger 12 with respect to the trip lever 11 of the eccentric 6. The lever arm 5 is further provided with a depending rod 14 pivotally mounted thereon and provided with a plunger 15, which is suspended within a solenoid 16. A terminal member 17, preferably of carbon, is secured to the lever 5 in alignment with a similar carbon terminal member 18 secured to a pivoted support lever 19, having an adjustable spring screw 20 secured at its free end to permit adjustment of the air gap, or space between the terminal members 17 and 18.

A clamping chuck 21 is secured to the free end of the lever 4 in working alignment with the stationary chuck 2, the said chucks being adapted to secure a pair of electrodes 22 and 23, respectively, to be welded. The chuck members 2 and 21 are connected in a welding circuit including conductors 30 and 31, having a source of electrical energy, such as a battery 32 and a resistor 33 connected in series therewith. A shunt circuit for the resistor 33, comprising conductors 37 and 38, is connected to the chuck member 21 through the contact members or terminals 17 and 18, respectively.

An operating circuit comprising line conductors 24 and 25 connected to a suitable source of electrical energy (not shown) and includes a solenoid 27 which is in working alignment with the movable contact member 28 which is adapted to engage a stationary contact 29, the said contact members constituting a switch connected in the welding circuit. A roller contact member 34 and a hand switch 26 complete the operating circuit. The solenoid 16 is connected across the line conductors 24 and 25 by the conductors 35 and 36, respectively.

My apparatus operates briefly as follows: A pair of electrodes 22 and 23 to be welded are connected in the circuit including conductors 30 and 31 and are clamped in the chucks 21 and 2, respectively. The lever 10 of the eccentric device is placed in a vertical position to maintain separation of the electrodes during the clamping operation. It is then advanced to the position a, Fig. 2, to rotate the eccentric pin 6 on its bearings causing the lever 4 to descend to effect contact of the electrodes. Sufficient pressure may be exerted on the lever 10 to produce good electrical contact of the electrodes 22 and 23. The subsequent operations are entirely automatic.

By closing the hand switch 26, the solenoids 16 and 27 are energized causing the movable contact 28 to connect with the contact 29 which closes the welding circuit setting up a current in the circuit 30—31 from the battery 32 through the resistor 33 and across the electrodes 22—23. Simultaneous with the establishing of the welding circuit, the solenoid 16 actuates the plunger 15 very rapidly.

The lever 5 pivotally connected to the plunger 15 moves downward and the finger 12 engages the trip lever 11 of the eccentric 6 causing it to rotate thereby actuating the lever 4.

As the hand lever 10 approaches its vertical neutral position, Fig. 1, the electrodes 22 and 23 are separated and an arc is established therebetween. The arc is of low intensity because the resistor 33 is in circuit and does not fuse the surfaces of the electrodes but functions as a pilot arc.

As the lever 5 continues its downward movement the members 17 and 18 are brought into contact which shortcircuits the resistor 33 and causes a welding current discharge from the battery 32 across the electrodes, setting up a welding arc of relatively high intensity which fuses the surfaces to be welded. By a further downward movement of the trip lever 11, the upper electrode 22 is brought into quick contact with the electrode 23 completing the weld. At this stage of the operation, the lever 10 is in the position indicated at b, on the opposite side of the vertical axis of the eccentric 6, relative to its starting position a.

The eccentric 6 functions similarly to a screw-thread in that the angle of the eccentric produces a wedging action with sufficient friction to hold it in position and prevent rebound or vibration after forging. As an additional safeguard the solenoid 16 remains energized and maintains a steady pressure against the lever 11 until the operation is completed. This is one of the important functions of this device. After cooling, to the point of solidification, which occurs in about .001 seconds, the circuit is broken by opening the switch 26 and the welded member is removed.

In this device, the duration of the heavy welding arc may be limited to .001 second, more or less, and the rotation of the eccentric shaft occurs within about .006 second. These time limits may be varied by manipulation of the contacts 17 and 18 and the leverage of the eccentric member as desired. The time of cooling the fused metal from a fluid to a solid state after contact is effected between the electrodes may be less than .001 second. It will be readily seen that, in order to produce good welds, closing of the electrode should be accomplished at a very high speed so that the operation is completed within a very narrow time limit, although longer time intervals, of the order of several seconds, may be employed.

It will be readily understood from the above description of my invention that an apparatus built in accordance therewith will function to produce percussive welds of a uniform quality. This is accomplished by the functioning of the eccentric device, which operates to produce a quick blow, followed by maintained pressure between the electrodes, thus preventing vibration. This is an entirely new operating characteristic and controls the uniformity of the welds produced.

Although I have described a specific embodiment of my invention, it will be obvious to those skilled in the art that various modifications may be made in the details of construction thereof without departing from the principles herein set forth. For instance, the separation of the electrodes and the percussive engagement thereof may be effected by utilizing an arrangement of a spring-actuated hammer employed in combination with a cam device, or various modifications may be made, such as actuating the trip lever of the eccentric directly by means of the solenoid. The welding circuit contact members 17 and 18 may be manipulated and timed electrically instead of mechanically.

The arrangement of the levers may be varied to give the leverage desired, or the chuck members and operating levers may be disposed vertically with respect to the support instead of horizontally, as shown. It will be obvious that any suitable source of electrical energy may be employed to produce the welding arc instead of the battery as indicated; for instance, a welding transformer or a condenser discharge. These and other changes may be made in the various details of my invention without departing from the spirit thereof.

I claim as my invention:

1. In an electric welding machine, a plurality of chucks connected to a source of electrical energy and adapted to secure a pair of electrodes to be welded, means for making contact between said electrodes to complete the welding circuit, means for breaking said contact to establish a minor arc and subsequently establishing a major arc to fuse the electrodes and means for effecting percussive engagement thereof.

2. In an electric welding machine, a plurality of chucks connected to a source of electrical energy and adapted to secure a pair of electrodes to be welded, means for making contact between said electrodes to complete the welding circuit, means for breaking said contact to establish a pilot arc and subsequently establishing a welding arc to fuse the electrodes and means for effecting percussive engagement thereof.

3. In an electric welding machine, a plurality of chucks connected to a source of electrical energy and adapted to secure a pair of electrodes to be welded, means for making contact between said electrodes to complete the welding circuit, means for breaking said contact to establish a pilot arc of relatively low intensity and subsequently establishing a welding arc of relatively high intensity to fuse the electrodes and means for effecting percussive engagement thereof.

4. In an electric welding machine, a plurality of chucks connected to a source of electrical energy and adapted to secure a pair of electrodes to be welded, means for making contact under pressure between said electrodes to complete the welding circuit, means for breaking said contact to establish a pilot arc and subsequently establishing a welding arc to fuse the electrodes and means for effecting percussive engagement thereof.

5. In an electric welding machine, a plurality of chucks connected to a source of electrical energy and adapted to secure a pair of electrodes to be welded, means for making contact between said electrodes to complete the welding circuit, means for breaking said contact to establish a pilot arc of relatively low intensity and subsequently establishing a welding arc of relatively high intensity to fuse the electrodes, means for effecting percussive engagement thereof and means for maintaining pressure between the electrodes.

6. In an electric welding machine, a plurality of chucks connected to a source of electrical energy and adapted to secure a pair of electrodes to be welded, means for making contact between said electrodes to complete the welding circuit, means for breaking said contact to establish a pilot arc of relatively low intensity and subsequently establishing a welding arc of relatively high intensity to fuse the electrodes, means for effecting percussive engagement thereof and means for maintaining pressure between the electrodes, said percussive means comprising a magnetically actuated hammer.

7. In an electric welding machine, a plurality of chucks connected to a source of electrical energy and adapted to secure a pair of electrodes to be welded, means for making contact between said electrodes to complete the welding circuit, means for breaking said contact to establish a pilot arc of relatively low intensity and subsequently establishing a welding arc of relatively high intensity to fuse the electrodes, means for effecting percussive engagement thereof and means for maintaining pressure between the electrodes, said percussive means comprising an automatically controlled, solenoid actuated hammer.

8. In an electric welding machine, a plurality of chucks connected to a source of electrical energy and adapted to secure a pair of electrodes to be welded, means for making contact between said electrodes to complete the welding circuit, means for breaking said contact to establish a pilot arc of relatively low intensity and subsequently establishing a welding arc of relatively high intensity to fuse the electrodes, means for effecting percussive engagement thereof and means for maintaining pressure between the electrodes, said pressure maintaining means comprising a mechanically operated eccentric trip dog which is locked in position subsequently to the percussive engagement of the electrodes.

9. In an electric welding machine, a base structure, a stationary chuck secured thereto, a supporting bracket, an eccentric tripping device pivotally and movably mounted in said bracket, a lever arm mounted on said eccentric and pivotally mounted at its end to permit angular movement thereof, a chuck secured to the movable end of said lever in working alignment with said stationary chuck, said chucks being adapted to secure a pair of electrodes to be welded and being connected to a welding circuit, a trip hammer pivotally mounted on said base and held in a neutral position by a coil spring, a plunger pivotally secured to said hammer disposed within a solenoid, means for energizing said welding circuit and solenoid to establish an arc between said electrodes and to simultaneously actuate said eccentric device to bring said electrodes into percussive engagement and to lock said movable chuck in position.

10. In an electric welding machine, a pair of chucks connected to a source of welding current and adapted to secure a pair of electrodes to be welded, means for actuating said chucks to effect percussive engagement of said electrodes and means for subsequently locking said chucks in position.

11. In an electric welding machine, a pair of chucks connected to a source of welding current and adapted to secure a pair of electrodes to be welded, means for actuating said chucks to effect percussive engagement of said electrodes and means for subsequently locking said chucks in position, said actuating means comprising a magnetically actuated hammer adapted to engage an eccentric member to cause relative motion of said electrodes.

12. In an electric welding machine, a plurality of chucks for gripping electrodes to be welded and an eccentric device adapted to separate said electrodes to establish an arc therebetween and to subsequently forge the same together.

13. In an electric welding machine, a plurality of chucks for gripping electrodes to be welded, and an eccentric device adapted to separate said electrodes to establish an arc therebetween and to subsequently forge the same together and lock said forged electrodes in position to prevent vibration thereof.

14. In an electric welding machine, an eccentric device for separating the members to be welded to establish an arc therebetween and to subsequently forge the same together.

15. In an apparatus for welding two electrodes, the combination including means for adjusting the electrodes in contact, means for separating and rapidly bringing together the electrodes, means including electrical circuits for causing a pilot arc of relatively low intensity to be struck when said electrodes are separated, and means automatically operating during the rapid bringing together of said electrodes for causing the arc to increase in intensity for a relatively brief period immediately prior to the fusion of the electrodes.

16. In an apparatus for welding two electrodes, the combination including means for causing a pilot arc of relatively low intensity to be struck between the electrodes, wedging means for forcing the electrodes together without a rebound, and means automatically operating during the approach of said electrodes for causing the arc to increase in intensity for a relatively brief period immediately prior to the fusion of the electrodes.

17. In an apparatus for welding two electrodes, the combination including means for adjusting the electrodes in contact, means for separating and rapidly bringing together the electrodes, means including electrical circuits for causing a pilot arc to be struck when said electrodes are separated, the circuit of said pilot arc including an impedance device for limiting the intensity of the current flow, a contact member on said first-mentioned means and a relatively stationary contact member for short-circuiting said impedance device during the rapid bringing together of said electrodes for causing the arc to increase in intensity for a relatively brief period immediately prior to the fusion of the electrodes, at least one of said contacts being yieldable, and means for adjusting the timing of said contacts.

18. In a welding machine, the combination including means for engaging a stationary electrode, a movable electrode holder, means for supplying the electrodes with electrical energy while the same are in contact, and an auxiliary moving member operable, during one period of its movement, to move the movable holder away from the stationary electrode to strike an arc and operable, during the final period of its movement, to cause a wedging engagement with said movable holder to forge the electrodes without a rebound.

19. In an apparatus for welding two electrodes, the combination including means for causing current to pass between the electrodes, means for separating the electrodes to cause an arc to be struck between the electrodes, and wedging means for rapidly forcing the electrodes together without a rebound.

20. A welding machine comprising a frame, a plurality of electrode holders mounted thereon, a cam member rotatably mounted in said frame and adapted to engage one of said holders, means for actuating said cam member and automatic means for actuating one of said electrode holders.

21. In a welding machine, the combination including means for engaging a stationary electrode, a movable electrode holder, means for supplying the electrodes with electrical energy while the same are in contact, and an auxiliary movable member having cam means for effecting a movement of said movable holder to strike an arc and subsequently effecting a movement of said movable holder to forge the electrodes.

22. In a welding machine, the combination including means for engaging a stationary electrode, a movable electrode holder, means for supplying the electrodes with electrical energy while the same are in contact, an auxiliary movable member having cam means for effecting a movement of said movable holder to strike an arc and subsequently effecting a movement of said movable holder to forge the electrodes, and means responsive to the movement of said auxiliary member for controlling said energizing means.

23. In a welding machine, the combination including means for engaging a stationary electrode, a movable electrode holder, means for supplying the electrodes with electrical energy, a cam member for controlling the movements of said movable holder, and a single means whereby the cam is set in motion and the electrical energizing means is applied to the electrodes, said cam operating, in its initial position, to hold said movable holder in a fixed position whereby the electrodes may be adjusted in position, said cam further operating, during the course of its movement, to separate the electrodes and to finally cause the electrodes to come together with a percussive blow.

In testimony whereof I have hereunto subscribed my name this 24th day of March, 1922.

ALLIS M. MacFARLAND.